United States Patent
Chen et al.

(10) Patent No.: US 7,350,024 B2
(45) Date of Patent: Mar. 25, 2008

(54) AUTOMATIC GENERATION OF SOFTWARE-CONTROLLED CACHING AND ORDERED SYNCHRONIZATION

(75) Inventors: Michael Chen, Palo Alto, CA (US); Dz-ching Ju, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 457 days.

(21) Appl. No.: 11/015,871

(22) Filed: Dec. 16, 2004

(65) Prior Publication Data
US 2006/0168399 A1  Jul. 27, 2006

(51) Int. Cl.
*G06F 12/00* (2006.01)
(52) U.S. Cl. ................. 711/118; 711/133
(58) Field of Classification Search ............. None
See application file for complete search history.

(56) References Cited

U.S. PATENT DOCUMENTS

| | | | |
|---|---|---|---|
| 6,480,918 B1 * | 11/2002 | McKenney et al. | 710/200 |
| 6,622,189 B2 * | 9/2003 | Bryant et al. | 710/200 |
| 7,114,035 B2 * | 9/2006 | Day et al. | 711/133 |
| 2002/0065992 A1 * | 5/2002 | Chauvel et al. | 711/141 |
| 2003/0050996 A1 * | 3/2003 | Yohe et al. | 709/217 |
| 2003/0219027 A1 * | 11/2003 | Kim et al. | 370/419 |
| 2004/0143712 A1 * | 7/2004 | Armstrong et al. | 711/152 |
| 2006/0112219 A1 * | 5/2006 | Chawla et al. | 711/114 |

OTHER PUBLICATIONS

Cooper, et al., "Compiler-Controlled Memory," In Proceedings of ASPLOS-VIII, San Jose, CA, Oct. 1998, pp. 2-11.

\* cited by examiner

*Primary Examiner*—Donald Sparks
*Assistant Examiner*—Ngoc Dinh
(74) *Attorney, Agent, or Firm*—Trop, Pruner & Hu, P.C.

(57) ABSTRACT

A method for applying software controlled caching and ordered thread optimizations in network applications includes collecting statistics for program variables, selecting program variable candidates for ordered synchronization and/or software controlled cache optimization, performing a safety check to ensure candidates can be properly optimized, and generating code for selected optimization candidates.

5 Claims, 7 Drawing Sheets

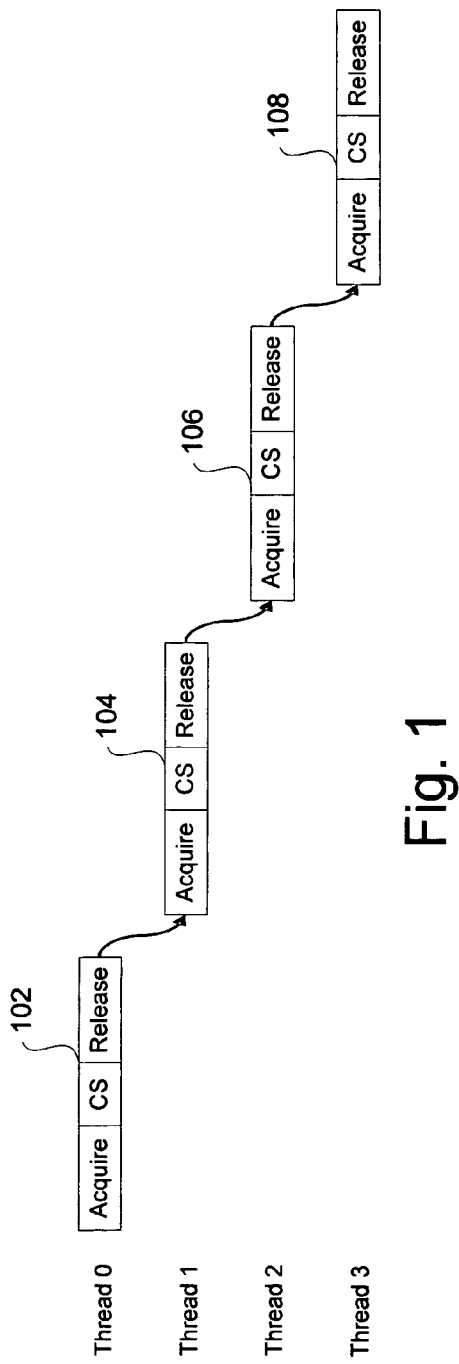
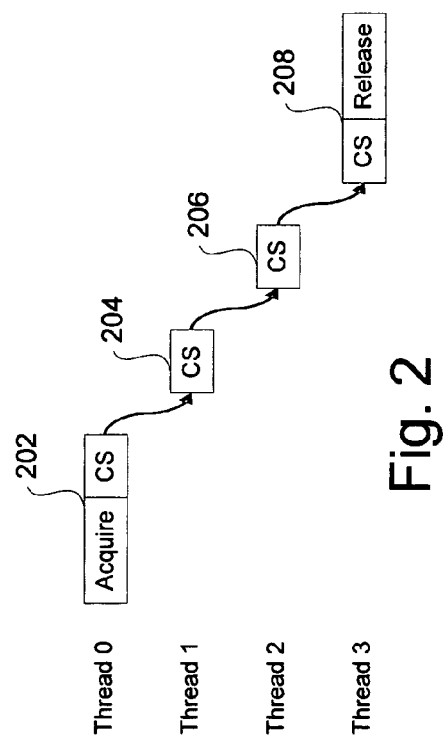
Fig. 1
Fig. 2

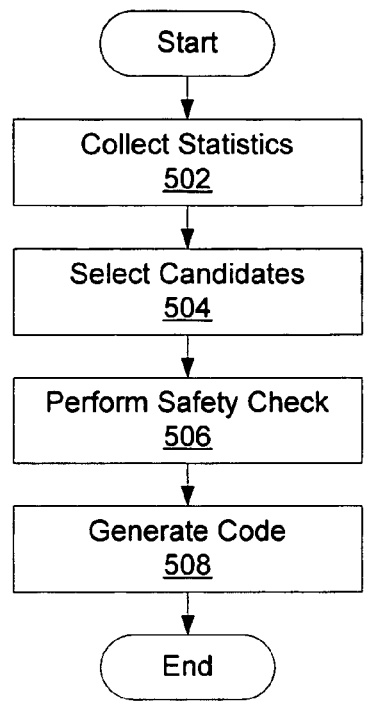

Fig. 5

| Optimization | Statistic | Granularity |
|---|---|---|
| Ordered Synchronization | Lock acquire and release frequency | Lock |
| Protected software-controlled caching | Access Frequency | Variable, multi-granularity |
| | Cache Hit Rate | Variable, multi-granularity |
| Unprotected software-controlled caching | Load access Frequency | Variable, multi-granularity |
| | Store access Frequency | Variable, multi-granularity |
| | Cache Hit Rate | Variable, multi-granularity |

Fig. 6

```
700 if( !Is_In_CAM( line_addr ) )
{
        e = LRU_Entry()
        if( Is_Dirty( e ) )
        {
                Writeback( e )
        }
        Load_Line( e, line_addr )
}
v = Get_Value( line_addr, line_offset )
```

Fig. 7

```
800 if( cnt++ > check_frequency )
{
        cnt = 0
        u = Load_Update_Flag( line_addr )
        if( u )
        {
                Invalidate_All_Cache_Entries()
                Clear_Update_Flag( line_addr )
        }
}
//
// Access cache line normally using line_addr and line_offset
//
```

Fig. 8

```
                            900 thread = Get_Current_Thread()
    if( Is_First_Thread( thread ))
    {
            Acquire_Lock( lock )
    }
    //
    // Critical section protected by lock
    //
    if( Is_Last_Thread( thread ))
    {
            Release_Lock( lock )
    }
    else
    {
            Signal_Thread( (thread + 1) % N_Threads )
    }
```

Fig. 9

AUTOMATIC GENERATION OF SOFTWARE-CONTROLLED CACHING AND ORDERED SYNCHRONIZATION

BACKGROUND

Embodiments of the present invention relate to software-controlled caching and ordered synchronization.

Network processors are becoming a core element of high-speed communication routers, and are designed specifically for packet processing applications. In most packet processing applications, individual packets can typically be processed independently and in parallel with other packets. To take advantage of this parallelism, some network processors, including Intel® IXP network processors, contain many small, multi-threaded processing engines called microengines (MEs) for handling packets.

Individual MEs do not have any hardware caches. This increases the density of MEs that can be placed in a given area. However, network processors have a hierarchy of memory with different capacities and access latencies. For example, a network processor may include Local Memory, Scratchpad Memory, SRAM, and DRAM, each having a different latency, as shown in Table 1, below.

TABLE 1

| Memory Level | Logical Width (bytes) | Size (bytes) | Unloaded latency in ME cycles |
| --- | --- | --- | --- |
| Local Memory | 4 | 2560 | 3 |
| Scratchpad Memory | 4 | 16K | 60 |
| SRAM | 4 | 4M-256M | 90-150 |
| DRAM | 8 | 64M-2G | 120-300 |

Because MEs typically do not contain hardware caches, it is important to minimize memory accesses and access latencies in order to increase packet throughput.

BRIEF DESCRIPTION OF THE DRAWINGS

A better understanding of the present invention can be obtained from the following detailed description in conjunction with the following drawings, in which:

FIG. 1 is an illustration of an un-optimized lock access.

FIG. 2 is an illustration of an optimized lock access.

FIG. 5 is a flow diagram illustrating a method according to one embodiment.

FIG. 6 is a table illustrating statistics which may be collected according to one embodiment.

FIGS. 7-9 are pseudocode examples of code that may be generated for each optimization

DETAILED DESCRIPTION

Figure 3:
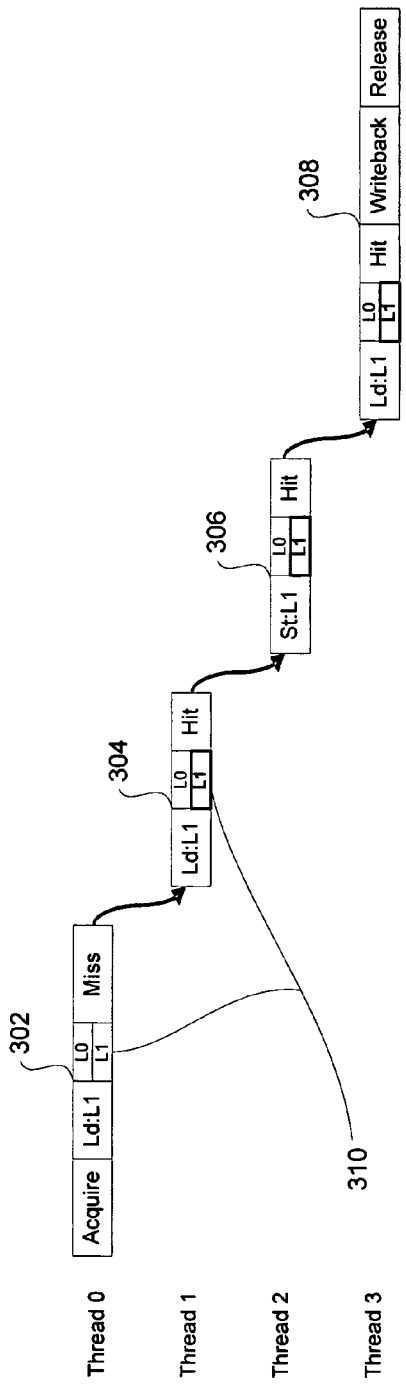
FIG. 3 is an illustration of a protected software controlled cache.

In the following description, for purposes of explanation, numerous details are set forth in order to provide a thorough understanding of embodiments of the present invention. However, it will be apparent to one skilled in the art that these specific details are not required in order to practice the present invention as hereinafter claimed.

Embodiments of the present invention concern the use of compiler optimizations to automatically apply software-controlled caching and ordered synchronization to improve memory access performance. Although the following discussion centers on Intel® IXP network processors using Internet Protocol (IP) version 4 (IPv4), it will be understood by those skilled in the art that embodiments of the present invention may be practiced in support of any network processor using any packet protocol or any other type of processor or computer system that does not include a traditional hardware cache. Embodiments may also be practiced in support of any general multi-threaded programs to reduce memory bus traffic and memory latency penalties.

Intel® IXP network processors are designed for a programming model where copies of the same code are typically mapped to multiple threads on a single ME or several MEs. Global synchronization locks that protect critical sections are maintained in memory external to a ME. If the code running on the threads accesses the same lock, then each thread will have to access external memory to acquire and release the lock, as illustrated in FIG. 1. Here, a lock shared by threads 0-3 of a ME. A lock is first acquired by thread 0 and then is released (102) after a critical section (CS) is executed. This sequence continues for threads 1 (104), 2 (106), and 3' (108), and may result in significant memory access overheads.

FIG. 2 illustrates how this overhead may be reduced according to an embodiment. To reduce the overhead associated with lock accesses, the lock may first be accessed once for all the threads in the ME (202), then each thread may execute the critical section (CS) (202, 204, 206, 208), and finally the lock may be released (208). This process is called ordered synchronization. Ordered synchronization eliminates repeated lock acquires and releases by individual threads. This optimization does not violate the semantics of the protected region because only one thread can execute the critical section at a time, and cannot be interrupted. Effectively, the overhead of accessing the shared lock from its home location may be eliminated by passing ownership of the lock between the threads of one or more MEs.

According to one embodiment, the lock optimization of FIG. 2 may be automatically generated by a compiler.

Network applications may have spatial and/or temporal memory locality in the application data structures, rather than in the packets being processed. Some examples of network applications having data locality include, but are not limited to, a Network Address Translation (NAT) router, a Quality of Service (QoS) router, packet compression, and IP packet forwarding.

A NAT router application allows multiple clients in a private, local area network (LAN) to access an external wide area network (WAN), which may be the internet, through a single IP address. Data locality may exist in table entries that map active connections from clients in the LAN to the WAN.

QoS routers may maintain bandwidth guarantees for user-defined flows. Data locality for QoS routers may be found in table entries corresponding to active packet flows.

To improve available bandwidth, IPv4 packets may be compressed over slow links, such as serial or wireless connections. Packet compression may be achieved by transmitting only the differences between packets. Data locality for packet compression may be found in table entries that hold previous packets for a given connection.

For IP packet forwarding, a tree structure, or trie, may be used to look up the next hops for a given destination IP address. Since a lookup must traverse the tree from its root, there may be data locality in the top nodes of a trie.

According to embodiments of the present invention, software-controlled caching may be used for these and other applications to reduce memory access latency.

Software controlled caching places copies of frequently accessed memory in Local Memory to reduce the access latency. It may be implemented using special routines, content addressable memory (CAM), and Local Memory. CAM is a fully associative memory that may be used as a fast hardware lookup table to map a key to a table entry. In one embodiment of a software controlled caching optimization, memory loads may be replaced with code that first checks if the value can be found in Local Memory. A hit in the software cache may avoid a slow access to lower levels of memory.

FIG. 3 illustrates how a shared global data structure access that is protected by a lock may implement a software controlled cache that is the functional equivalent of a hardware write-back cache. After a lock is acquired (302), memory load (Ld) and store (St) operations attempt to access the Local Memory cache (310) first, resulting in a hit or a miss. Valid cache entries are indicated by bold boxes. When thread 0 attempts to access the cache to load L1, a miss results (302) so a lower level of memory must be accessed to load L1, but L1 is placed in the cache. When thread 1 attempts to access the cache to load L1 (304), L1 now exists in the cache, and a hit results. Similarly, when thread 2 accesses the cache to store L1 (306), a hit results. Finally, when thread 3 accesses the cache to load L1 (308), a hit results, a writeback occurs, and the lock is released.

In this embodiment, the cache is empty when the lock is acquired. Writes to cached entries may be held in the Local Memory for a ME. Updates are written back to lower levels of memory just before the protecting lock is released. For protected software controlled caching to work in this manner, ordered synchronization must have been applied to the protecting lock, as described above in conjunction with FIG. 2.

In another embodiment, unprotected software controlled caching may be used. Ordered synchronization may not be required for unprotected software controlled caching. This form of caching may be used for unprotected, infrequently written, shared global data structures that are tolerant of delayed updates to the cached copies. Data structures having this behavior include, but are not limited to trie routing tables, classifier hash tables, and QoS statistics. Infrequent writes to these structures are generally from the user-controlled core to add new table entries or to update shared statistics.

Figure 4:
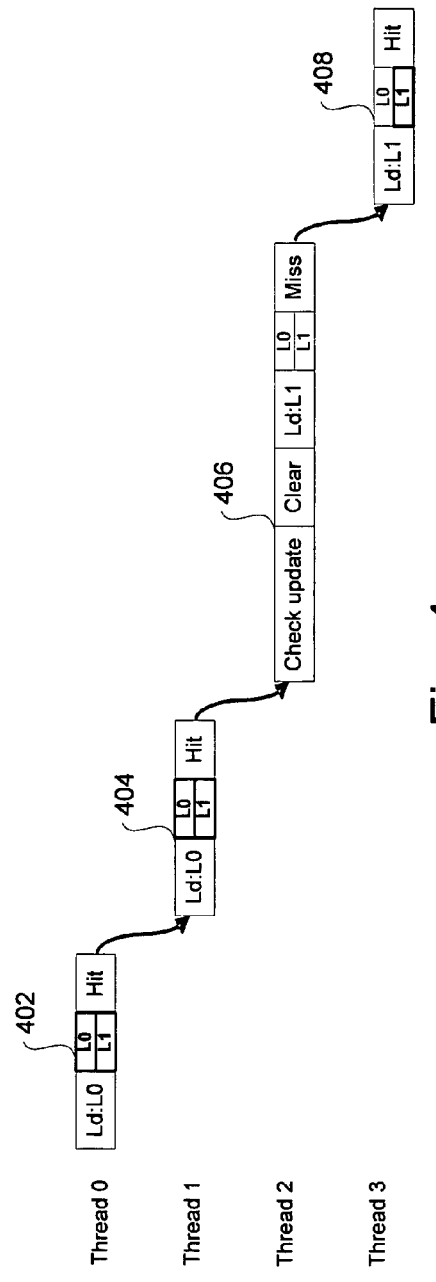
FIG. 4 is an illustration of an unprotected software controlled cache.

FIG. 4 illustrates how unprotected software controlled caches may schedule periodic checks to see if the software controlled cache must be invalidated due to updates of the original data structure according to one embodiment. In both thread 0 (402) and thread 1 (404), the software cache contains valid entries for both L0 and L1. Only thread 2 (406) checks the update flag to determine if memory has been updated. In this example, the flag indicates that the memory has been updated, thus the cache must be cleared (406) to force loading of updated values. When thread 4 accesses the cache to load L1 (408), there is not a valid cache entry because the cache has been cleared by thread 3 (406). The cache is updated with L1 as a valid entry (408) for subsequent cache accesses, until the cache is once again cleared.

In one example, a ME running IPv4 forwarding may check for updates in the original routing table only on every tenth packet, but uses the cached entries ninety percent of the time. Checking infrequently for updates of cached global data structures may eliminate some memory accesses and the I/O delays associated with these accesses.

The MEs in IXP network processors do not have traditional hardware caches. The lack of caches means that any caching facility, such as the protected and unprotected cache structures described above in conjunction with FIGS. 3 and 4, above, must be supported by manually programming code or by automatic generation of software controlled caching by a compiler.

An embodiment of a general compiler flow for generating memory optimizations for ordered synchronization, protected software controlled caching and unprotected software controlled caching is illustrated in FIG. 5.

First, as illustrated in block 502, statistics are collected for each optimization, including ordered synchronization, protected software controlled caching, and unprotected software controlled caching. FIG. 6 is a table which illustrates statistics which are relevant to identifying the most promising optimization candidates according to an embodiment. Candidates for optimization may be globally shared program variables, including, but not limited to, integers, arrays, structs, and objects. For ordered synchronization, lock acquire and release frequency statistics may be gathered for each candidate. For protected software controlled caching, both access frequency and cache hit rate statistics may be gathered. For unprotected software controlled caching, statistics for load access frequency, store access frequency, and cache hit rate may be gathered. Statistics may also be gathered for different granularities of the optimization candidates. For example, for an array, a candidate may be one element of the array or the entire array. For software caching candidates, statistics may be gathered for both cases, or in other words, for both granularities. In other embodiments, more or fewer statistics than those described in FIG. 6 may be gathered.

The statistics may be collected in many possible ways. In one embodiment, a detailed functional intermediate representation (IR) simulator using profiling counters (PCs) may be used. To calculate the expected software caching hit rate, simulated caches may be maintained for caching candidates. It will be recognized by one skilled in the art that similar statistics may be gathered in a number of other ways, any of which may be used in other embodiments of the invention.

Returning to FIG. 5, after statistics are collected, candidates for optimization are selected based on these statistics, as illustrated in block 504. The statistics collected are analyzed to determine the most promising optimization candidates. In one embodiment, high access frequency is used for selecting a variable for all three optimizations. In another embodiment, a high cache hit rate may be used for selecting a variable for optimization. The candidates for optimization may be selected based on a static, predetermined threshold for one or more statistics (e.g. a cache hit rate greater than 75%, etc.), or, may be selected dynamically.

After candidates for optimization have been selected, a safety check is performed to prevent errors and to ensure that the optimization is correct and appropriate for the selected candidates, as illustrated by block 506. Some safety checks may cause candidates to be invalidated. Others may result in additional code inserted to handle special cases.

Finally, after the safety checks are performed, code is generated for each candidate to be optimized, as shown by block 508.

FIG. 7 illustrates pseudocode (700) for a code sequence that may be generated for candidates for a protected software-controlled cache access, according to one embodiment.

FIG. 8 illustrates pseudocode (800) for a code sequence that may be generated for candidates for an unprotected software-controlled cache access, according to one embodiment.

FIG. 9 illustrates pseudocode (900) for a code sequence that may be generated for candidates for ordered synchronization, according to one embodiment.

It will be recognized that the code sequences generated for each of the optimizations described may be different than those described by the pseudocode of FIGS. 7-9 according to other embodiments, and that any code sequence which performs one of the optimizations described above may be substituted without departing from the scope of the present invention.

Figure 10:
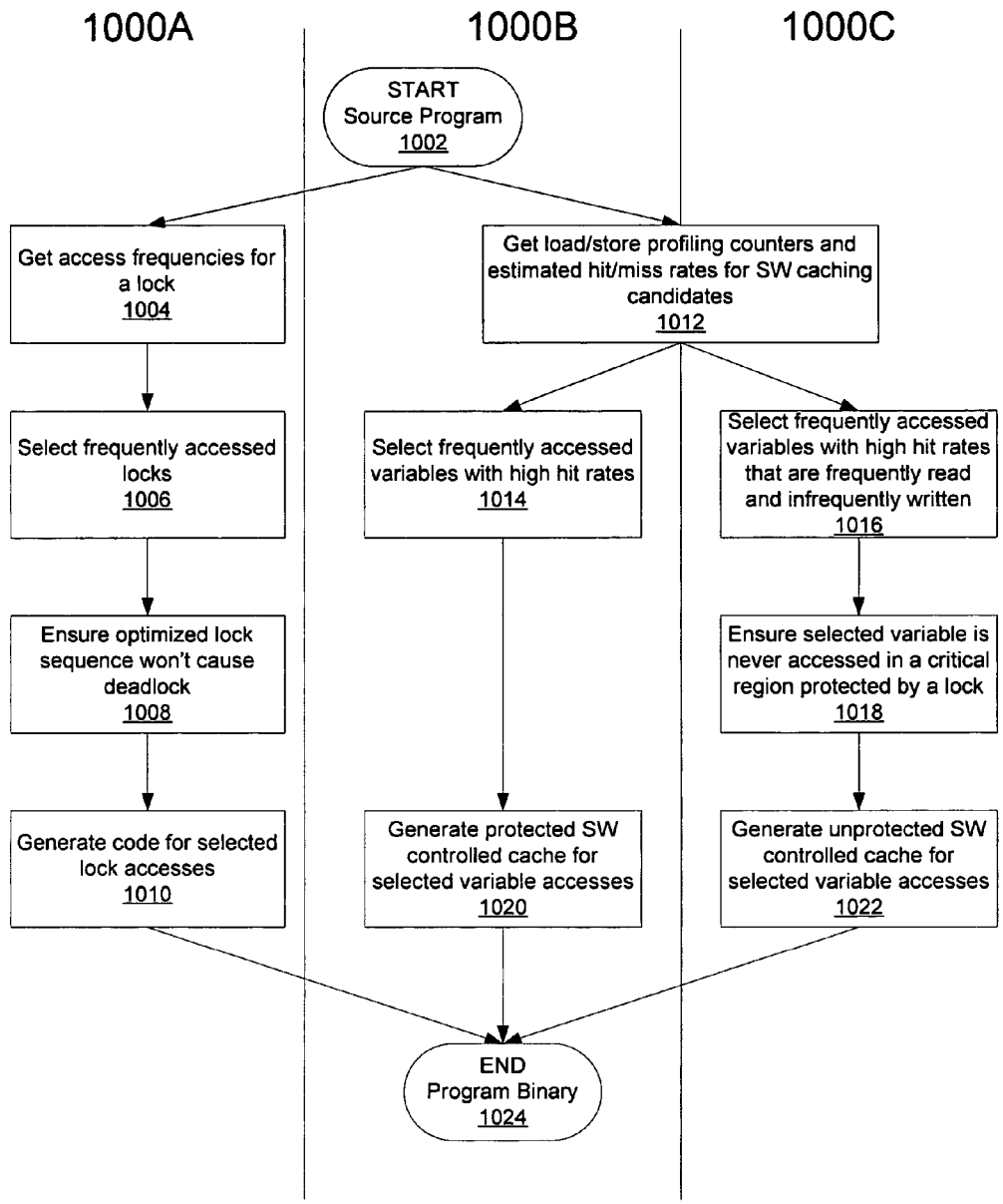
FIG. 10 is a flow diagram illustrating a method according to one embodiment.

FIG. 10 is a flow diagram which depicts a detailed compiler flow for automatic generation of ordered synchronization, protected software controlled caches, and unprotected software controlled caches according to an embodiment of the present invention. The method set forth by this flow diagram may be used for all program variables to determine appropriate optimization candidates. The flow diagram is divided into three regions: a region for ordered synchronization optimization (1000A), a region for protected software controlled cache optimization (1000B), and a region for unprotected software controlled cache optimization (1000C). These optimizations may be made by a compiler on a source program (1002).

For the ordered synchronization optimization (1000A), access frequencies for a lock are determined in the statistics collection phase (1004). Candidates are selected by determining which locks are frequently accessed and selecting those locks (1006). In one embodiment, frequently accessed locks may be those that are accessed more than a predetermined number of times. After the frequently accessed locks are selected, a safety check is performed to ensure that the optimized lock sequence will not cause deadlock (1008). In one embodiment, because ordered synchronization requires explicit signaling between threads on a ME, compiler analysis will insert signaling code on all possible control flow paths so that deadlock cannot occur. Finally, code will be generated for the selected lock accesses (1010). Pseudocode representing an example of code that may be generated for ordered synchronization is shown in FIG. 9.

For both protected and unprotected software controlled caching optimization (1000B, 1000C), load/store profiling counters and estimated hit/miss rate statistics are gathered for all possible granularities of software controlled caching candidates (1012).

For protected software controlled caching optimization (1000B), frequently accessed variables with high hit rates are selected (1014). Because a safety check is done for ordered synchronization variables, and because ordered synchronization is required for protected software controlled caching, no further safety check is required for protected software controlled caching candidates according to one embodiment. Finally, protected software controlled cache code will be generated for the selected variables (1020). Pseudocode representing an example of code that may be generated for a protected software controlled cache is shown in FIG. 7.

For unprotected software controlled caching optimization (1000C), frequently accessed variables with high expected hit rates that are frequently read and infrequently written are selected (1016). Candidates that appear outside of critical regions may be selected for unprotected software controlled caching. A safety check is required to ensure that the variable is never accessed in a critical region protected by a lock (1018). Finally, unprotected software controlled cache code will be generated for the selected variables (1022). Pseudocode representing an example of code that may be generated for an unprotected software controlled cache is shown in FIG. 8.

Figure 11:
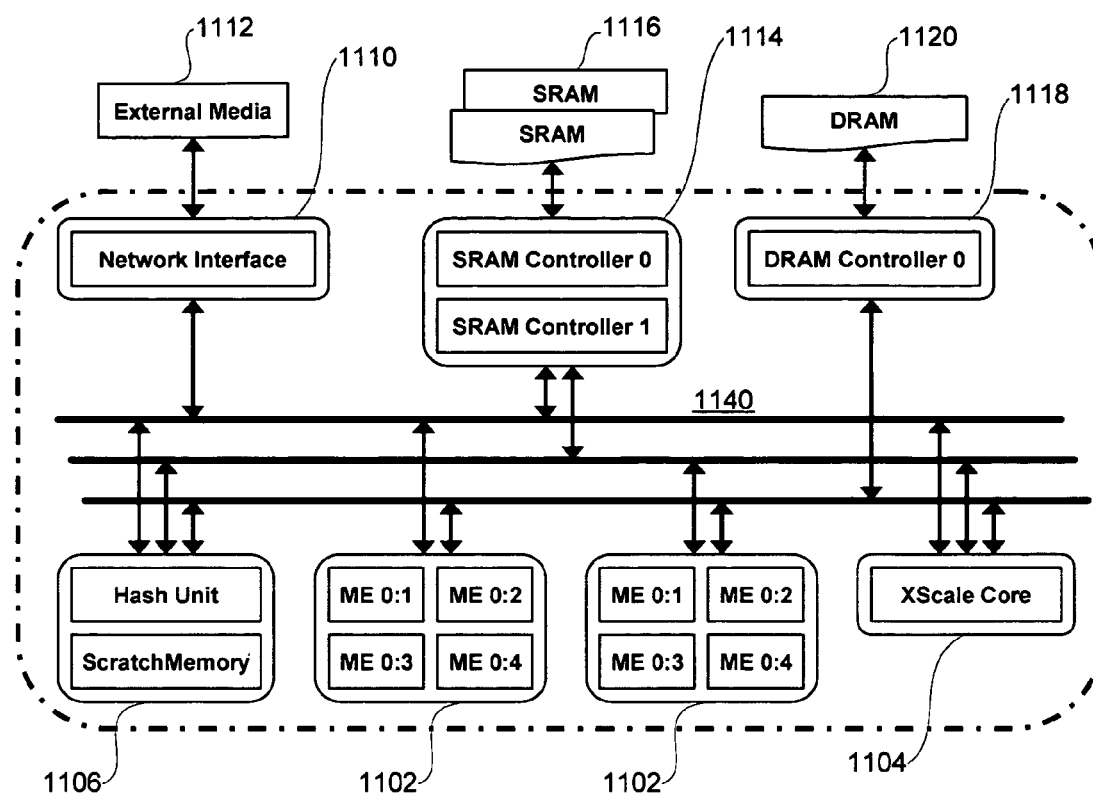
FIG. 11 is an illustration of a system according to one embodiment.

FIG. 11 is a block diagram of an example system adapted to implement the methods disclosed herein according to one embodiment.

The system includes one or more network processors or network processor cores (1102), which each may include one or more microengines (MEs). Each ME may include content addressable memory (CAM) and Local Memory, which may be used together as a software controlled cache according to one embodiment. In another embodiment, CAM is not required to implement a software controlled cache, for example, where the optimizations are implemented entirely in software and only Local Memory is used to store cache values. The processors are coupled to other components in the system by a bus (1140).

The system may also include another processor core (1104), such as an Intel® XScale core, which is coupled to the bus (1140) and performs dedicated processing functions. A hash unit and scratch memory (1106) are also coupled to the bus. In one embodiment, the scratch memory may have a size of up to approximately 16 kB, and may have a latency of approximately 60 cycles.

The system also includes one or more memory controllers, such as a DRAM controller (1118) and one or more SRAM controllers (1114). The memory controllers (1118, 1114) may perform functions that enable a processor or processor cores (1102, 1104) to access and communicate with memory (1116, 1120) via a bus (1140).

The SRAM controller (1114) is coupled to the bus (1140) and also coupled to one or more banks of SRAM (1116). In one embodiment, the SRAM may be up to approximately 128 MB in size, and may have a latency of approximately 90 cycles. The DRAM controller is coupled to the bus (1140) and also coupled to DRAM (1120). In one embodiment, the DRAM may be up to approximately 1 GB in size, and may have a latency of approximately 120 cycles.

Memory (1106, 1116, 1120) may be used to store information and instructions to be executed by the processors or processor cores (1102, 1104). Memory (1106, 1116, 1120) may also be used to store temporary variables or other intermediate information while the processors or processor cores (1102, 1104) are executing instructions.

The system may also include a network interface (1110) that is coupled to bus (1140). The network interface (1110) is coupled to external media (1112), which may be a LAN, WAN, or other external media.

While the components shown in FIG. 11 are depicted as separate blocks within the system, the functions performed by some of these blocks may be integrated within a single semiconductor circuit or may be implemented using two or more separate integrated circuits. For example, although the SRAM controller (1114) and the DRAM controller (1118) are depicted as separate blocks within the system, persons of ordinary skill in the art will readily appreciate that the SRAM controller (1114) and the DRAM controller (1118) may be integrated within a single semiconductor circuit.

The methods set forth above may be implemented via instructions stored on a machine-accessible medium which are executed by a processor. The instructions may be implemented in many different ways, utilizing any programming code stored on any machine-accessible medium. A machine-accessible medium includes any mechanism that provides (i.e., stores and/or transmits) information in a form readable by a machine, such as a computer. For example, a machine-accessible medium includes random-access memory (RAM), such as static RAM (SRAM) or dynamic RAM (DRAM); ROM; magnetic or optical storage medium.

Thus, a method, machine readable medium, and system for applying software controlled caching and ordered thread optimizations in network applications are disclosed. In the above description, numerous specific details are set forth. However, it is understood that embodiments may be practiced without these specific details. In other instances, well-known circuits, structures, and techniques have not been shown in detail in order not to obscure the understanding of this description. Embodiments have been described with reference to specific exemplary embodiments thereof. It will, however, be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

We claim:

1. An article of manufacture comprising a machine-accessible storage medium having stored thereon instructions which, when executed by a machine, cause the machine to:

collect statistics for access frequency and cache hit rate to identify potential optimization candidates for software controlled caching;

select optimization candidates based on statistics which indicate an access frequency that is greater than a first predetermined value and a cache hit rate that is greater than a second predetermined value and based on statistics which indicate a variable that has a read frequency that is greater than a fourth predetermined value and a write frequency that is less than a fifth predetermined value; and generate a code sequence for each of the selected optimization candidates.

2. The article of manufacture of claim 1, wherein the instructions further cause the machine to perform a safety check to ensure that optimization of the selected optimization candidates will not cause an error.

3. The article of manufacture of claim 1, wherein the instructions further cause the machine to collect statistics for lock acquire and release frequency to identify potential optimization candidates for ordered synchronization.

4. The article of manufacture of claim 3, wherein the instructions further cause the machine to select optimization candidates based on statistics which indicate a lock acquire and release frequency that is greater than or equal to a third predetermined value.

5. The article of manufacture of claim 1, wherein the potential optimization candidates are program variables.

* * * * *